United States Patent
Eggleton et al.

[11] Patent Number: 6,108,474
[45] Date of Patent: Aug. 22, 2000

[54] OPTICAL PULSE COMPRESSOR FOR OPTICAL COMMUNICATIONS SYSTEMS

[75] Inventors: Benjamin John Eggleton, Berkeley Heights; Gadi Lenz, Fanwood, both of N.J.

[73] Assignee: Lucent Technologies Inc., Murray Hill, N.J.

[21] Appl. No.: 08/989,093

[22] Filed: Dec. 11, 1997

[51] Int. Cl.[7] .................................................. H04J 14/08
[52] U.S. Cl. .......................... 385/122; 385/123; 385/27; 385/37; 359/138; 359/161
[58] Field of Search .................. 385/122, 123, 385/27, 37; 359/135, 138, 161

[56] References Cited

U.S. PATENT DOCUMENTS

| | | | |
|---|---|---|---|
| 3,801,937 | 4/1974 | Bristol | 333/196 |
| 4,588,957 | 5/1986 | Balant et al. | 359/341 |
| 5,035,481 | 7/1991 | Mollenauer | 359/124 |
| 5,136,677 | 8/1992 | Drexhage et al. | 385/123 |
| 5,148,510 | 9/1992 | Borrelli et al. | 385/142 |
| 5,499,134 | 3/1996 | Galvanauskas et al. | 359/333 |
| 5,717,799 | 2/1998 | Robinson | 385/37 |

FOREIGN PATENT DOCUMENTS 408298340A  11/1996  Japan .

Primary Examiner—John D. Lee
Assistant Examiner—Michael J. Stahl
Attorney, Agent, or Firm—Matthews, Collins, Shepherd & Gould, P.A.

[57] ABSTRACT

In accordance with the invention, an optical pulse compressor comprises a pulse source, a section of nonlinear optical waveguide including a periodic structure, such as a Bragg grating, for providing positive dispersion and a section of linear optical waveguide including a negative dispersion component. The nonlinear waveguide should have a second order index $N_2$ at least ten times the second order index $N_2'$ of the linear waveguide. The nonlinear waveguide is preferably chalcogenide fiber, with a Bragg grating photoinduced into the core. Because the grating is 4–5 orders of magnitude more dispersive than standard optical fiber, the length of the nonlinear waveguide section can be scaled down to a few centimeters with accompanying reduction of deleterious processes. Modeling suggests that compression factors of 5 with an initial 60 ps pulse are achievable with grating lengths of about 20 cm.

8 Claims, 4 Drawing Sheets

OPTICAL PULSE COMPRESSOR FOR OPTICAL COMMUNICATIONS SYSTEMS

FIELD OF THE INVENTION

This invention relates an optical pulse compressor particularly useful in time domain multiplexed optical communications systems.

BACKGROUND OF THE INVENTION

The demand for increasing bit rates in optical communication systems requires the generation of shorter optical pulses. In time domain multiplexed optical communications systems, a multiplicity of low bit rate binary optical pulse data streams are interleaved to form a single high bit rate data stream. To avoid overlap between pulses of different data streams, the duty cycle of the pulses on the low bit rate streams must be small. For example, a low bit rate stream may have a bit rate of 10 Gbits/s. This provides a time slot for each pulse of 100 ps. The pulse must be shorter than 100 ps. But if one wishes to interleave 10 such streams into a 100 Gbits/s system, then ten pulses must be fit into a 100 ps slot. Such short pulses cannot typically be obtained by the use of high speed electronics and conventional sources such as electroabsorbtion modulated lasers (EMLs).

Shorter pulses can be obtained by nonlinear optical pulse compressors. Such compressors typically comprise a source of optical pulses, a length of nonlinear optical fiber having positive dispersive properties (positive group velocity dispersion) and a negative dispersion component such as a grating pair or a prism pair. The nonlinearity increases the spectral bandwidth of the pulse which is chirped by the positive dispersion, and the subsequent negative dispersion component compresses the duration of the pulse to a bandwidth limited pulse.

One difficulty with the conventional pulse compressors is that they typically require long lengths of fiber (typically hundreds of meters) to provide the necessary positive dispersion. Intense pulses traveling along such fiber are subject to nonlinear processes such as stimulated Raman scattering which are detrimental to pulse compression. Accordingly, there is a need for an improved optical pulse compressor.

SUMMARY OF THE INVENTION

In accordance with the invention, an optical pulse compressor comprises a pulse source, a section of nonlinear optical waveguide including a periodic structure, such as a Bragg grating, for providing positive dispersion and a section of linear optical waveguide including a negative dispersion component. The nonlinear waveguide should have a second order index $N_2$ at least ten times the second order index $N_2'$ of the linear waveguide. The nonlinear waveguide is preferably chalcogenide fiber, with a Bragg grating in the core. Because the grating is several orders of magnitude more dispersive than standard optical fiber, the length of the nonlinear waveguide section can be scaled down to a few centimeters with accompanying reduction of deleterious processes. Modeling suggests that compression factors of 5 with an initial 60 ps pulse are achievable with grating lengths of about 20 cm.

BRIEF DESCRIPTION OF THE DRAWINGS

The advantages, nature and various additional features of the invention will appear more fully upon consideration of the illustrative embodiments now to be described in detail. In the drawings.

It is to be understood that these drawings are for purposes of illustrating the concepts of the invention and are not to scale.

DETAILED DESCRIPTION

This description is divided into two parts: Part I describes the structural features of the pulse compressor and an optical communications system using it. Part II describes the theory underlying the invention and presents a mathematical model of its operation.

I. The Optical Pulse Compressor and Communications System

Figure 1:
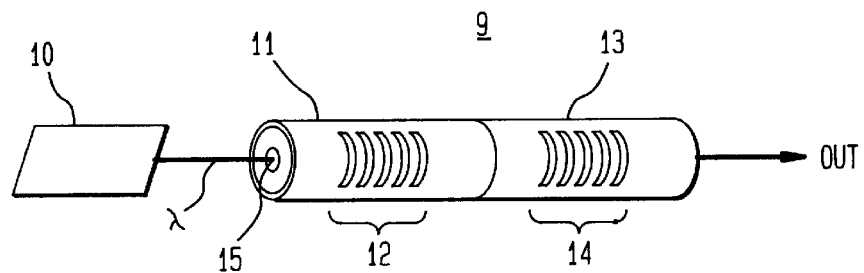
FIG. 1 is a schematic view of an optical pulse compressor in accordance with the invention.

Referring to the drawings, FIG. 1 is a schematic illustration of an optical pulse compressor 9 comprising a pulse source 10 of center wavelength λ, a first section of nonlinear waveguide 11 including a periodic structure 12 such as a Bragg grating for providing positive dispersion to the pulses and a second section of linear waveguide 13 including a negative dispersion component 14. The pulse source 10 is preferably a mode-locked laser or a semiconductor laser chosen and adapted to provide a transform limited pulse. Such a pulse has minimal spectral content for its width and typically cannot be further compressed without increasing its spectral bandwidth. The preferred center wavelength λ is about 1.55 μm.

The nonlinear section 11 preferably comprises a length of optical fiber into which a Bragg grating 12 has been formed as by UV radiation. The fiber preferably has a core 15 of material, such as chalcogenide glass, having nonlinear optical properties as compared with the second section. Specifically the first section should have a core with a second order index $N_2$ at least ten times that of the second order index $N_2'$ of the second section. Typically $N_2 > 100 N_2'$ and in general, the larger $N_2$ in relation to $N_2'$, the better. The length of the waveguide is typically less than 500 cm. The grating 12 is preferably an apodized grating having a region of steep positive dispersion for light of wavelength λ (close to the bandgap on the long wavelength side of the grating).

Alternative periodic structures for achieving dispersion include periodic photonic bandgap structures or periodic perturbations in the fiber cladding.

The linear waveguide 13 can be conventional transmission fiber and can be coupled to any negative dispersion component 14, such as a prism for providing negative dispersion. Preferably the component 14 is a grating. Here the waveguide is ideally a fiber with a core (not shown) of material, such as silica, having linear optical properties. The negative dispersion component 14 is an apodized Bragg grating having a region of steep negative dispersion for light of wavelength λ (the short wavelength side of the grating).

In operation, transform-limited pulses from source 10 enter the first section waveguide 11 where they propagate through grating 12 with high positive dispersion. The output of the first section is a pulse with greater duration and a greater spectral content. The wider spectrum pulse enters the negative dispersion section 13 and incurs chirp compensation which rearranges the spectral components to produce a substantially shorter pulse.

Figure 2:
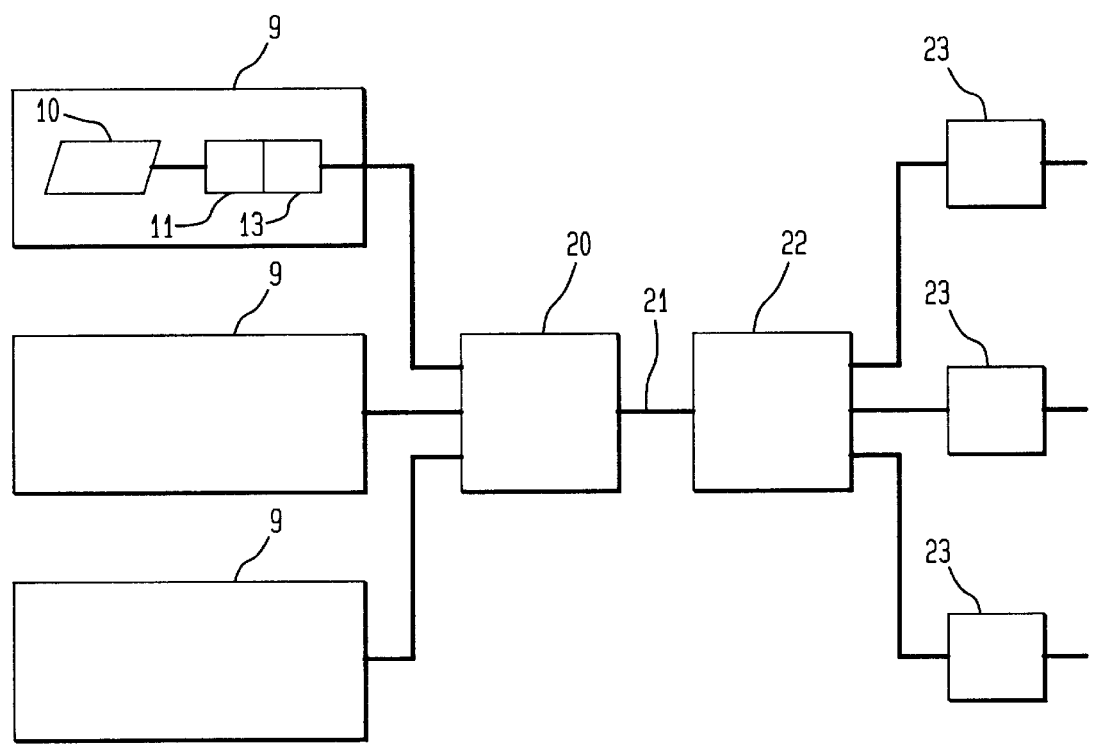
FIG. 2 is a schematic diagram of an optical communications system employing the optical pulse compressor of FIG. 1.

FIG. 2 schematically illustrates an optical communications system using the pulse compressor of FIG. 1. In essence, the system comprises a plurality of pulse compressors 9, a time division multiplexer 20, and a transmission fiber 21 for transmitting a plurality of time multiplexed signal channels. At the receiving end of fiber 21 is a time division demultiplexer 22 for presenting one or more of the transmitted channels to respective receivers 23. The compressors 9 are as described in FIG. 1. The remaining components are conventional and well known.

In operation each transmitter (e.g. each pulse source 10) launches a channel comprising a sequence of low bit rate, high duty cycle pulses into a respective dispersion section 11, 12 of a compressor. The resulting low bit rate, low duty cycle pulses are combined (interleaved) by multiplexer 20, and transmitted as a high bit rate time multiplexed stream on fiber 21. At a demultiplexer 22, one or more of the transmitted channels can be separated for reception by receivers 23.

II. Underlying Theory and Mathematical Model

Short pulse propagation in optical fiber in the near infrared (IR) spectral region, is governed mainly by self-phase modulation (SPM) via the Kerr effect and group velocity dispersion (GVD). The relative strength of these effects is typically given by a characteristic length scale—namely the dispersion length $L_D$, and the nonlinear length $L_{NL}$ defined as follows:

$$L_D = \frac{\tau_0^2}{s^2 \beta''} \quad (1)$$

$$L_{NL} = \frac{\lambda A_{eff}}{2\pi n_2 P}$$

here $\tau_0$, is the full width at half maximum (FWHM) pulse width, $\beta'' = d^2\beta/d\omega^2$ is the GVD of the fiber, $s^2$ is a numerical factor which depends on the pulse shape (2.77 for Gaussian and 3.11 for hyperbolic secant), $\lambda$ is the wavelength, $A_{eff}$ is the effective mode area, $n_2$ is the nonlinear index and P is the peak power of the pulse. The interplay of SPM and GVD leads to important pulse shaping in the fiber: for negative (or anomalous) GVD soliton effects dominate the pulse evolution. In the positive (or normal) dispersion regime the combined effects of SPM and GVD broaden the pulse spectrum, square the pulse and produce linear chirp across the entire pulse width, which may then be compensated by a negative dispersion element.

Compressing a transform-limited pulse requires spectral broadening which is achieved by using SPM, however pure SPM (for nonlinear phase shifts of a few $\pi$) leads to nulls in the pulse spectrum. These nulls cannot be removed by a linear system and for this reason both SPM and GVD are required in order to achieve the goal of producing compressed pulses close to the transform-limit (i.e. pulses of high quality both in the time and the spectral domain). The compression schemes which approach this ideal compression require lengths of fiber which are proportional to the geometric mean of $L_D$ and $L_{NL}$. Since from eqns. (1) $L_D$ is proportional to $\tau_0^2$ and $L_{NL}$ is proportional to $\tau_0$ (for fixed pulse energy) the ideal length L of the fiber scales as $\tau_0^{3/2}$, i.e., longer pulses require longer lengths of fiber for efficient compression. In addition, the intrinsic fiber dispersion in standard fiber is very small (usually on the order of 10 $ps^2$/km in the IR region) leading to very long dispersion lengths. This implies that for long input pulses propagating in a standard fiber compressor, the fiber will have to be very long for ideal compression. In this case the peak power has to be scaled down to avoid exceeding the threshold for stimulated Raman Scattering, which is detrimental to compression. For example, if the pulse is 10 picoseconds long with a center wavelength of 1.5 $\mu$m and propagates in standard fiber, the dispersion length is approximately 5 km. For a pulse energy of 1 nJ, the nonlinear length is approximately 0.5 m and in this case the Raman threshold is exceeded and a good compressor is not feasible. Therefore, in order to observe nonlinear pulse shaping for pulsewidths on the order of 10–100 picoseconds (e.g. from modelocked Nd:YAG or semiconductor lasers), in short lengths of fiber, a highly dispersive fiber element is required. Such an element is a fiber grating, where the wavelength of operation is just outside the stopband (photonic gap).

Fiber gratings have very large GVD close to the grating stopband. This is a direct consequence of the Kramers-Kronig relations: since the grating constitutes a sharp resonance, it is accompanied by strong dispersion. Viewed in another way, the multiple reflections in the grating introduce a time delay that is highly frequency-dependent. By operating just outside the stopband, the grating is used in transmission (the passband) and by apodizing the grating the ripples in the amplitude response can be eliminated. In typical fiber gratings the GVD can be up to six orders of magnitudes larger than the plain fiber GVD. This very high dispersion is limited to approximately the bandwidth of the stopband. The increase in GVD reduces the dispersion length from tens of km to a few centimeters. We here show that efficient pulse compression of picosecond pulses may be achieved by using very short lengths of fiber with appropriate fiber gratings to produce square pulses with linear chirp across them. These pulses may then be compressed using a linear system with anomalous GVD such as a prism pair, grating pair or fiber grating device.

Pulse compression is typically achieved in one of two ways: 1) soliton compression or 2) fiber-grating or fiber-prism compression. The latter method is usually preferred since it yields cleaner compressed pulses, whereas soliton compression is typically accompanied by pedestals on the compressed pulse. In the second method a fiber with positive dispersion is used to broaden the pulse spectrum and to generate a square intensity profile with very linear chirp across the pulse. SPM generates new frequencies and broadens the pulse spectrum and the GVD linearizes the chirp and "squares" the pulse. The linear chirp can then be compensated by a negative dispersive element (such as a grating pair, prism pair or a chirped fiber grating operating in reflection), producing a nearly transform-limited compressed pulse. This technique was applied successfully to produce some of the shortest optical pulses. It should be stressed that this method relies on nonlinear effects and spectral broadening, which is in contrast to simple chirp compensation by devices such as chirped gratings. These chirp compensators are linear systems that do not generate new bandwidth. In the following analysis we will assume linearly polarized pulses and neglect linear and nonlinear birefringence effects.

The pulse compression technique is governed by two important parameters:

$$N = \sqrt{\frac{L_D}{L_{NL}}} \quad (2)$$

$$z_{opt} \approx \sqrt{6L_D L_{NL}} \text{ for } N \gg 1.$$

The length $Z_{opt}$ is the optimum length of the fiber (if $z<Z_{opt}$ the chirp is not linearized yet and for $z>Z_{opt}$, the GVD-induced pulse broadening and corresponding reduction in peak intensity leads to SPM losing its effectiveness) and the best compression results are achieved with a fiber length $z=Z_{opt}$. In this case, $F_c$, the compression factor, is related to N through $N=1.6 F_c$.

Once the linearly chirped square pulse emerges from the fiber it needs to have its chirp compensated by an anomalous dispersion element—typically a grating pair or prism pair, both of which have very small higher order dispersion and no associated nonlinearity. However if the nonlinearity is small enough or the peak power is low enough (such that $L<<L_{NL}$), then a fiber grating may be used since it has opposite sign GVD on the two sides of the stopband. It should be emphasized that the nonlinear part of the compressor gives these ideal results when only GVD and SPM are present, i.e., when there is no higher order dispersion or higher order nonlinearities. The linear section of the compressor ideally has only negative GVD.

A limiting factor in standard fiber compressors is the threshold for stimulated Raman scattering (SRS). This threshold scales with peak intensity and fiber length—once the threshold is reached pulse compression degrades significantly. In picosecond duration experiments this usually means using fiber lengths much shorter than the optimum lengths $L<<Z_{opt}$). In this regime an approximate expression for the compression ratio is given by:

$$F_c \approx 1+0.6(N^2 L/L_D) \quad (3)$$

This compression factor can be much less than the compression achieved with the optimum fiber length. Long lengths of fiber are needed for picosecond pulse compression, because of the relatively small fiber dispersion in the near IR. A fiber grating operating in the passband but close to the stopband acts as a highly dispersive element, with a second order dispersion given by:

$$\beta_g'' = \left(\frac{n}{c}\right)^2 \frac{1}{\delta} \frac{(\kappa/\delta)^2}{(1-(\kappa/\delta)^2)^{3/2}} \quad (4)$$

where n is the linear refractive index, c is the speed of light, $\kappa=\pi\Delta n\, \eta/\lambda_B$ is the grating coupling coefficient with $\Delta n$ the index modulation depth, $\eta$ the fraction of the energy in the fiber core and $\lambda_B$ is the Bragg wavelength. $\delta=(n/c)(\omega-\omega_B)$ is the detuning parameter with $\omega_B$, the Bragg frequency. The detuning is positive on the short wavelength side and negative on the long wavelength side where the GVD is positive. Since we are considering only positive GVD the detuning will always be negative. To avoid confusion in the following discussion we will deal with the absolute value of $\delta$ rather than $\delta$ itself.

Close to the band edge ($\delta=\kappa$) higher order dispersion terms cannot be neglected; the cubic dispersion, which is the next coefficient in the Taylor series expansion of the phase (or propagation), is given by $$\beta_g''' = \left(\frac{n}{c}\right)^3 \frac{1}{\delta^2} \frac{(\kappa/\delta)^2}{(1-(\kappa/\delta)^2)^{5/2}} \quad (5)$$

For efficient pulse compression this cubic term must be minimized. To compare the relative importance of the second and third order dispersion a figure of merit may be defined as follows:

$$M = \frac{\beta_g'''}{\beta_g'' T_0} = 3\frac{n}{cT_0}\frac{1}{|\delta|}\frac{1}{1-(\kappa/\delta)^2} \quad (6)$$

where $T_0$ is the full width at the $1/e^2$ intensity point. For a given pulse width and grating strength (characterized by $\kappa$), the above relation will yield the detuning required to achieve a certain M.

Figure 3:
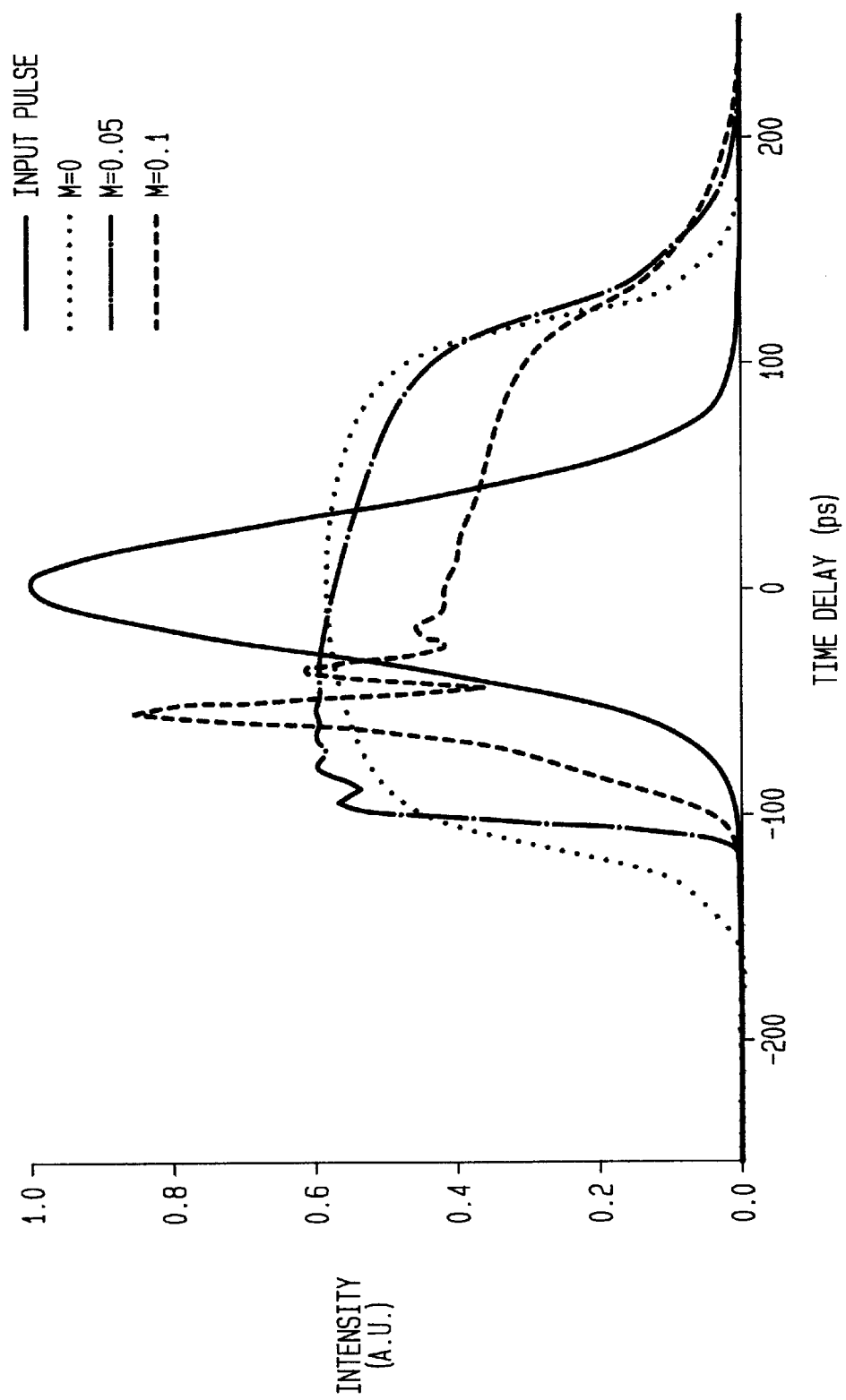
FIG. 3 is a graphical simulation of an input pulse propagated in three different dispersion media.

To demonstrate the effect of third order dispersion on compression we add a small amount of cubic dispersion to an ideal compressor (which contains only GVD and SPM) and simulate a 70 ps transform-limited gaussian input pulse propagating in a homogeneous medium with GVD, SPM and cubic dispersion. FIG. 3 shows the results of this simulation for 3 values of the M parameter. M=0 represents the ideal case of no cubic dispersion and M=0.1 and 0.05 are also shown (as a point of-reference: for standard fiber with the same input pulse $M=7\times10^{-5}$). As can be seen third order dispersion introduces pulse asymmetry as well as structure on the leading edge which will cause some trailing energy on the compressed pulse. A reasonable M value is therefore <0.05. As an example we consider pulse width of 70 ps and a grating strength of $\kappa=100$ cm$^{-1}$ (corresponding to a $\Delta n=0.004$, $\lambda_B=1.06$ $\mu$m and $\eta=80\%$) using M=0.05 in eqn. 6 yields a detuning parameter of 123 cm$^{-1}$ (which corresponds to a 1.5 nm shift relative to the Bragg wavelength). We can now use eqn. (4) to calculate the second order dispersion and we get $\beta''=64$ ps$^2$/cm, which is about $3\times10^5$ larger than standard fiber at this wavelength. This in turn means that the dispersion length is scaled down from kilometers to centimeters.

We emphasize the following points: 1) The above relations are for a grating operating in transmission (i.e., in the passband). 2) This dispersive behavior of the grating outside the stopband is similar to the strong dispersion found near any sharp resonance. 3) It is clear that because of the proximity of the resonance very high dispersion may be achieved relative to the material dispersion of fiber, which is the result of very far resonances. 4) In order to avoid complications resulting from the side lobes in the grating response, apodization of the grating may be used to remove these side lobes. 5) The dispersion at the wavelength of operation may be tuned to some extent by applying heat or strain to the grating, which changes the linear index and therefore the detuning parameter and the dispersion. These properties show the fiber grating to be a very versatile and useful dispersive element.

The general design criteria for pulse compression are limited by two factors: the peak intensity and the higher order dispersion. High peak intensity is detrimental because it leads to 1) SRS, 2) shifting of the Bragg resonance (similar to the optical Stark effect) and to an intensity-dependent dispersion close to the stopband, and 3) truncation of the initial pulse spectrum which gets broadened by SPM: if the broadening is larger than the detuning parameter the spectrum will get "clipped" by the grating. Finally, higher order dispersion leads to pulse distortion as shown earlier. However if this higher order dispersion is also compensated by the compensating section, this may not be a problem. We now examine the limits imposed by these different effects on the design of the fiber grating.

The threshold for SRS dictates an upper limit on the product of peak power and fiber length as follows:

$$\frac{g_R P L_{eff}}{A_{eff}} < 16 \Rightarrow PL < \frac{16 A_{eff}}{g_R} \quad (7)$$

where $g_R$, is the Raman gain coefficient at the wavelength of operation and $L_{eff}$ is the effective length limited by loss. In our case the lengths of interest are such that $L_{eff} \approx L$. This leads to a lower limit on the nonlinear length defined in eqn. (1):

$$L_{NL} > \frac{g_R \lambda}{32 \pi n_2} L \quad (8)$$

The limit expressed in (8) is a general limit for this type of compressor and therefore is not related to the grating parameters. The next two limits to be discussed are specific to fiber gratings:

1) an intensity-dependent shift of the Bragg resonance leading to nonlinear dispersion. For $\kappa << \delta_0$, $L_{NL} \delta_0 << 1$ is required to minimize this effect (here $\delta_0$, is the low intensity detuning parameter).

2) The last limitation imposed by the peak intensity is due to SPM induced spectral broadening of the input pulse spectrum. This broadening will be approximately $F_c$, since this is the intended purpose of the compressor. We now have to insure that this spectrum does not overlap the reflection spectrum of the grating, since this would cause the spectrum to be clipped. The input bandwidth (FWHM) of a transform-limited Gaussian pulse of width (FWHM) $\tau_0$, is given by $\Delta \nu = 0.441/\tau_0$, and the output spectral bandwidth is approximately $0.441 F_c/\tau_0$. Half of this spectral bandwidth must be smaller than the spectral distance from the band edge ($|\delta| = \kappa$):

$$|\delta| - \kappa > \frac{2 \pi n}{c} 0.22 \frac{F_c}{\tau_0} = 1.39 \frac{n}{c \tau_0} F_c = \frac{1.39}{l} F_c \quad (9)$$

where l is the spatial length of the pulse in the fiber at the input of the grating.

Finally we consider a purely linear property of the grating, namely the higher ordered dispersion. As shown earlier this limitation comes from the figure of merit M. Using eqn.(6) we get a lower limit on the detuning parameter (given the grating strength):

$$|\delta| > \frac{3n}{2 M \tau_0 c} + \sqrt{\left(\frac{3n}{2 M \tau_0 c}\right)^2 + \kappa^2} \quad (10)$$

which in turn will put an upper limit on the GVD. If we define $\delta_c$, as the limiting value above the upper limit on the GVD can be written as:

$$\beta'' < \left(\frac{n}{c}\right)^{1/2} \left(\frac{M \tau_0}{3 \delta_c}\right)^{3/2} \kappa^2 \quad (11)$$

We can now place a lower limit on the dispersion length by using its definition (eqn. (1)):

$$L_D > \left(\frac{c}{n}\right)^{1/2} \left(\frac{3 \delta_c}{M}\right)^{3/2} \frac{\sqrt{\tau_0}}{\kappa^2 s^2} \quad (12)$$

Since the compression factor scales with N it is clear that for maximum compression we would like to operate at the lower limit of the nonlinear length and at the same time maximize the dispersion length. However, by increasing the dispersion length the optimum length will increase and we are limited by the grating lengths that are technologically feasible. A good measure would be the ratio of the optimum length (as defined in eqn. (2)) and the grating length L:

$$q \equiv \frac{z_{opt}}{L} \approx \sqrt{6 \left(\frac{L_D}{L}\right)\left(\frac{L_{NL}}{L}\right)} \quad (13)$$

The SRS-imposed limit is the strictest one since it involves only material parameters and the wavelength of operation (the other intensity-dependent limitations may be avoided by careful grating design). In this case q will be determined by the normalized dispersion length $L_D/L$ and will increase with a square root dependence. Since ideally we would like q=1 this will put an upper limit on the dispersion length. In particular for q>>1, the compression factor is given approximately by $1+0.6 N^2 (L/L_D)$ rather than N/1.6. We will therefore restrict ourselves to q values not much larger than 1 and using eqn. (13) with the definition of the compression factor $F_c$ we can finally write an absolute upper limit for the compression ratio:

$$F_c \approx \frac{N}{1.6} = \frac{q}{1.6 \sqrt{6}} 32 \pi \frac{n_2}{\lambda g_R} = 25.65 q \frac{n_2}{\lambda g_R} \quad (14)$$

Note that the above relation holds for this type of compression in general and does not contain any grating parameters. Ideally we would like to design a grating which achieves this compression ratio and which has a reasonable length.

Numerical Examples

We now look at the parameters required for pulse compression of a 60 ps Gaussian pulse with a center wavelength of 1.06 $\mu$m. At this wavelength the measured value of the Raman gain (at $\lambda=1$ $\mu$m) is $g_R=10^{-11}$ cm/W and $n_2=2.6 \times 10^{-16}$ cm$^2$/W so for q=1 the upper limit on the compression factor as given by eqn. (14) is about 6.3. We will outline the design parameters for a grating which will enable a compression of about 5. It has been demonstrated experimentally that the Raman threshold for a 60 ps pulse at 1.06 $\mu$m propagating through 10 meters of fiber is about 1 kW, so for grating lengths of up to 1 meter an input peak power of 10 kW may be used. The corresponding nonlinear length (for an effective mode area of 50 $\mu$m$^2$) is $L_{NL}=3.2$ cm, which may be used as a lower limit. In order to get a compression factor of 5, $L_D=64$ cm, $L_{NL}=207.4$ (with a corresponding GVD of 6.3 ps/cm) and an optimum length of 63.5 cm. By choosing the detuning $\delta=-80$cm$^{-1}$ and the grating strength K=32.4 cm$^{-1}$ we get an M parameter of 0.05 (with a cubic dispersion term of 18.9 ps$^3$/cm). It can easily be verified that all these numbers are within the limits outlined in the previous section. Recently 1 m long gratings have been demonstrated, so that a 63.5 cm grating is feasible. A shorter grating of 20 cm will degrade the compression factor by less than 10%.

Figure 4A:
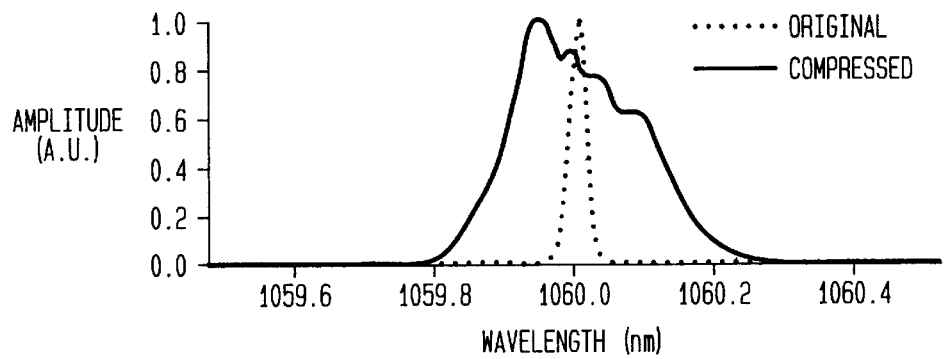
FIGS. 4a, 4b and 4c are graphical displays of pulse amplitude in the wavelength and time domains.
Figure 4B:
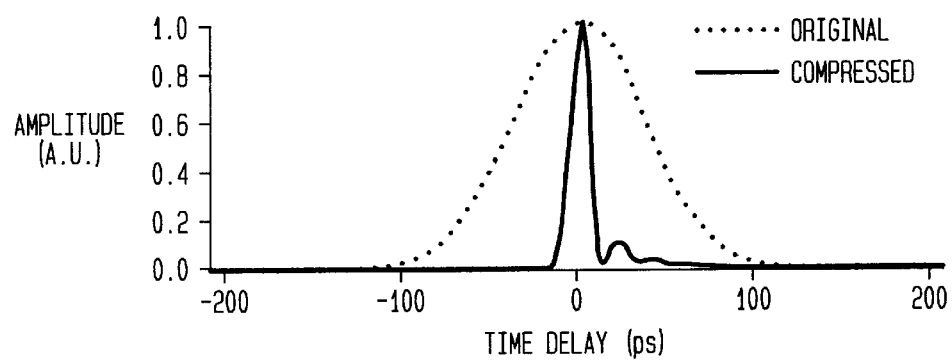
Figure 4C:
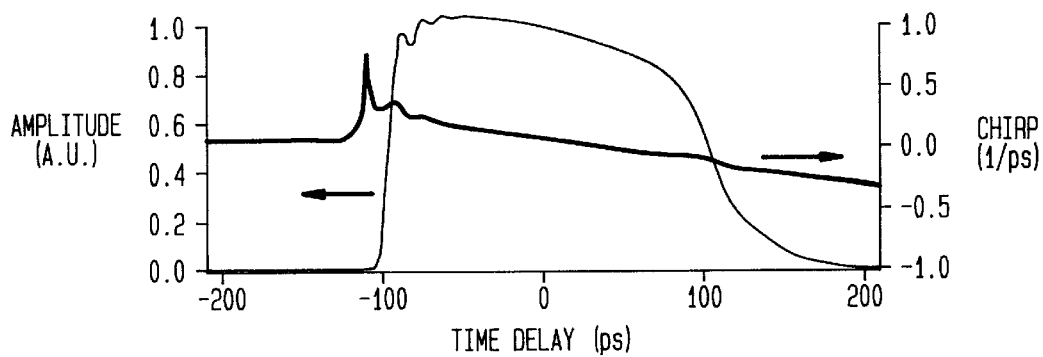
Figure 5A:
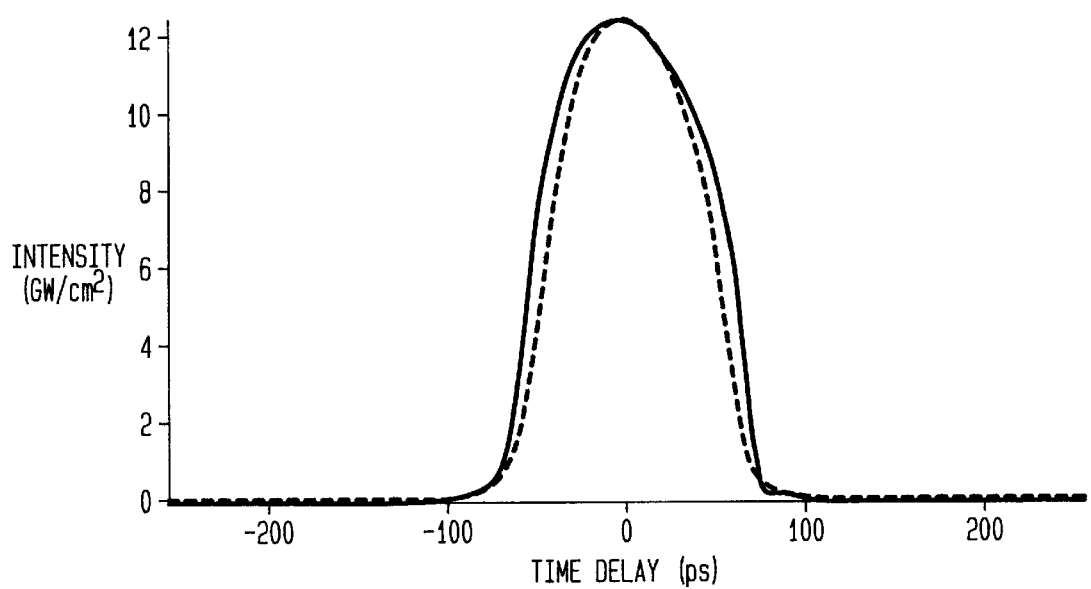
FIGS. 5a and 5b are intensity profiles of pulses before and after compression, respectively.
Figure 5B:
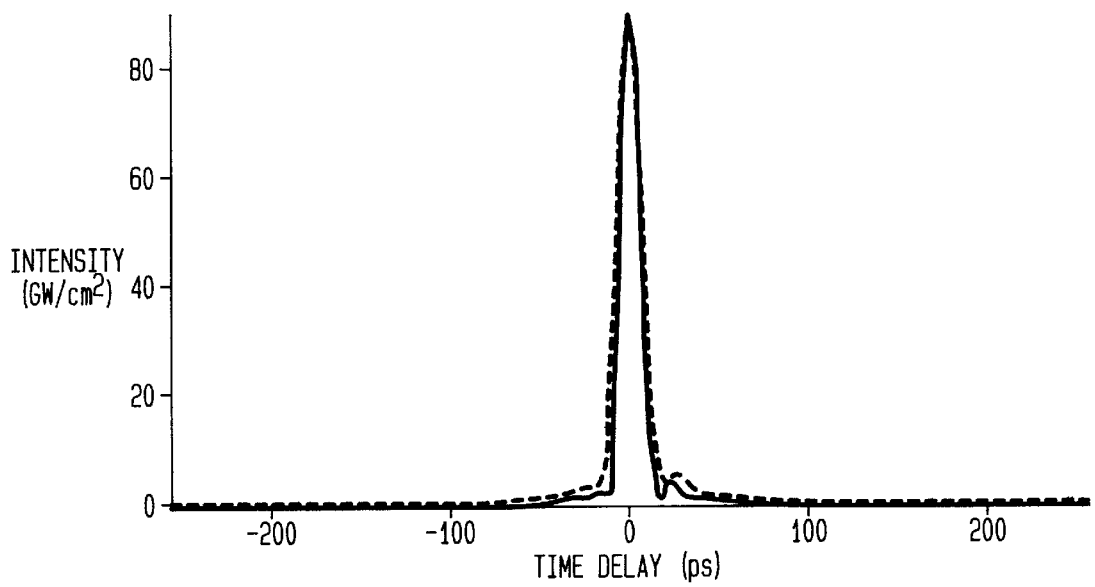

Using these parameters we simulated numerically the propagation in two different ways: 1) a full numerical solution of the nonlinear coupled equations for the apodized grating and 2) a split-step Fourier method through a homogeneous medium with the above material parameters. In both cases we look at the output pulse before the compensating section. In FIG. 4(a) and 4(b) we show the input and output pulses, respectively, in the time and frequency domain and in FIG. 4(c) we show the pulse and the chirp across it just before the compensating section. As can be seen the compressed pulse has some residual trailing energy in the time domain and small ripple in its spectrum (both consequences of the small third order dispersion), but is still of reasonably high quality. In this case we used the simpler split step routine. FIGS. 5A and 5B compares the results of the two different simulation methods using the same parameters but with a grating length of 20 cm. FIG. 5(a) shows the intensity profile of the pulse before the dispersion compensating section and 5(b) shows the resulting compressed pulse at the output of the system with a compression factor of 4.6.

The close agreement between the two simulation methods demonstrates that far from the stop band, the grating may be viewed as an effective homogenous nonlinear dispersive medium to which the nonlinear Schrodinger (NLS) equation may be applied. This is a significant simplification for numerical calculations since the split step fourier method is simpler to implement and is much faster. This NLS approximation is valid when the pulse is far enough in spectrum from the gap such their "interaction" is small. This may be quantified by the spectral bandwidth (i.e., the pulse spectrum should be a few bandwidths away from the edge of the gap) and the peak intensity ($\delta L_{NL} \gg 1$).

What is claimed:

1. An optical pulse compressor for compressing in time optical pulses from a pulse source, said compressor comprising:

a first section of optical waveguide including a transmissive waveguide Bragg grating for providing positive dispersion to said optical pulses, said first section being nonlinear optical waveguide characterized by a second order refractive index $N_2$;

optically coupled to said first section of optical waveguide, a second section of optical waveguide optically coupled to a component for providing negative dispersion to said pulses, said second section being linear optical waveguide characterized by a second order refractive index $N_2'$ less than $0.1 N_2$, whereby a transform limited pulse transmitted through said first section including said Bragg grating and said second section including said component is compressed in time.

2. An optical pulse compressor according to claim 1 wherein said first section has a length of less than 500 cm.

3. An optical pulse compressor according to claim 1 wherein said first section of optical waveguide comprises a section of chalcogenide glass fiber including a periodic Bragg grating and having a length of less than 500 cm.

4. An optical pulse compressor according to claim 1 wherein said Bragg grating comprises an apodized Bragg grating.

5. An optical pulse compressor according to claim 1 wherein $N_2'$ is $0.01 N_2$ or less.

6. An optical pulse compressor according to claim 1 wherein said component for providing negative dispersion is a Bragg grating.

7. An optical communications system comprising a plurality of optical pulse compressors according to claim 1 for producing a respective plurality of compressed pulse signal channels;

a time division multiplexer for interleaving said signal channels in time to produce a time multiplexed signal; and a transmission waveguide for transmitting said time multiplexed signal.

8. A system according to claim 7 further comprising a time division demultiplexer for separating one or more channels from said time multiplexed signal.

* * * * *